United States Patent [19]

Lowe

[11] 4,026,584

[45] May 31, 1977

[54] COUPLING FOR CONDUITS

[76] Inventor: Grayson Lowe, 2900 Long Lake Road, Lapeer, Mich. 48446

[22] Filed: Oct. 16, 1975

[21] Appl. No.: 623,260

[52] U.S. Cl. .............................. 285/96; 285/369; 285/382; 285/DIG. 16

[51] Int. Cl.[2] ...................................... F16L 17/00

[58] Field of Search ............. 285/96, 97, 294, 100, 285/297, 104, 105, 106, 369, 382, DIG. 16; 138/93, 99; 251/5; 137/225, 231; 279/2 A

[56] References Cited

UNITED STATES PATENTS

| 2,054,492 | 9/1936 | Young | 285/97 X |
|---|---|---|---|
| 3,023,995 | 3/1962 | Hopkins | 285/97 X |
| 3,033,594 | 5/1962 | Cushman | 285/97 |
| 3,420,554 | 1/1969 | Stroub | 285/97 |

FOREIGN PATENTS OR APPLICATIONS

| 1,491,334 | 7/1967 | France | 285/97 |

Primary Examiner—Dave W. Arola

[57] ABSTRACT

There is disclosed a device having utility to easily couple in abutting relationship an end of each of two conduits, for instance. The device includes a sleeve means adapted and constructed to encompass the outer end portions of each of two tubular conduits. The sleeve has positioned therein essentially co-extensive thereof a tubular shaped member constructed of an elastomeric material. The elastomeric member is secured to the sleeve only at the ends thereof thereby defining an annular material receiving area between the inner surface of said sleeve and the outer surface of the elastomeric member. The sleeve has valve means for effecting communication to said material receiving area. Material under pressure may be introduced through the valve means to thereby expand the material receiving area while at the same time causing the elastomeric member to thrust inwardly in the direction of the encompassed ends of the respective conduits. The conduits are thereby embraced in leak-proof coupling arrangement either temporarily or permanently as desired depending upon the nature of the pressurizing material.

9 Claims, 5 Drawing Figures

COUPLING FOR CONDUITS

BACKGROUND OF THE INVENTION

The need for coupling together the ends of conduits such as pipes and pipe fittings is well known. Many of the prior art devices include an elastomeric gasket having an annular interior cavity intended to be expanded by pressure injection of a solidifiable material to grip the ends of aligned conduits and thereby effect a fluid tight connection. These have been unsatisfactory due to the presence of atmospheric gases in the cavity creating voids in the expanding medium with attendant joint failure. Attempts to solve this defect by incorporating valve means to exhaust the gases also appear in existing art. Because of the impracticability of designing valve mechanisms which will allow the escape of gases yet seal at the proper time to insure expansion of the cavity by the injected material, these have also failed to achieve the desired results.

In other embodiments of such concepts intended to effect a temporary coupling of conduits means have been lacking to insure positive release of the coupling upon disassembly.

The prior art devices have also not been as satisfactory as they could be in providing for either temporary or permanent coupling by employing a device simply constructed of relatively few parts. It will be seen from the following description that considerable advantages are apparent in the present invention.

SUMMRY OF THE INVENTION

The device of the present invention includes a cylindrical sleeve adapted and constructed to surround the outer end portions of each of two similar tubular conduits. The sleeve which may be of metal or other rigid material has positioned therein essentially co-extensive therewith a tubularly shaped member constructed of elastomeric material such as rubber or synthetic resin. The member is secured only to the sleeve at the ends thereof. The sleeve has a normally closed valve means for effecting communication to the inside of the sleeve between it and the outer surface of the said member. As the said member is not secured to the internal portion of the sleeve, except at the ends thereof, and as the member is constructed to normally resiliently extend radially outwardly against the inside of the sleeve, there is thereby defined therebetween a zone which normally prior to use of the device constitutes what may be said to be an evacuated zone. Fluid material under pressure is introduced through the valve means into said evacuated zone to thereby fill and expand said zone, thereby forcing the said member inwardly in the direction of said surrounded portions of the respective ends of the conduits. The conduits are held in coupling arrangement either temporarily or permanently as desired depending upon the nature of the pressurizing material which may be a hardenable polymer when the connection is to be permanent.

Other advantages will come to mind as the invention is considered in greater detail below. It will be seen that the invention consists of the novel details of construction arrangement and combination of parts more fully hereinafter described and illustrated in the accompanying drawings where reference numerals refer to like parts throughout.

DETAILED CONSIDERATION AND DESCRIPTION OF THE INVENTION

Figure 1:
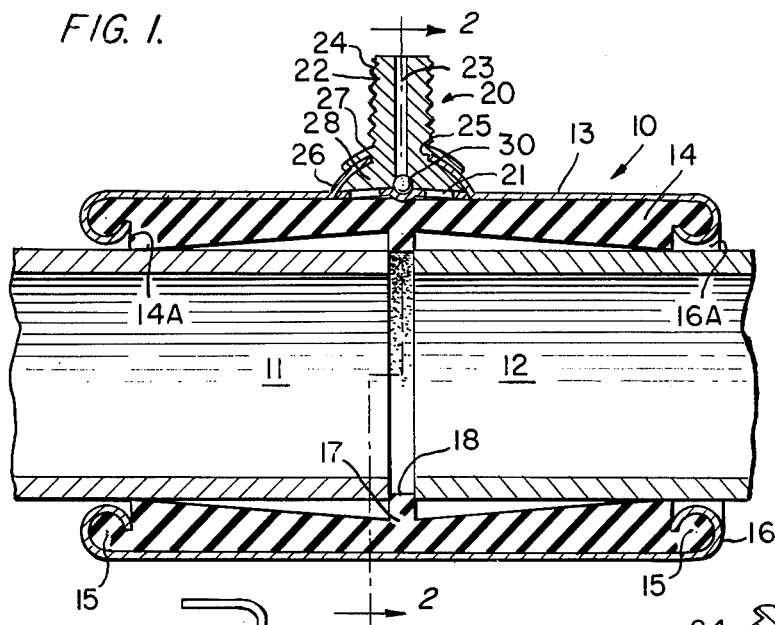
FIG. 1 is a cross-sectional view of the device of the present invention in place on the end portion of two conduits.
Figure 2:
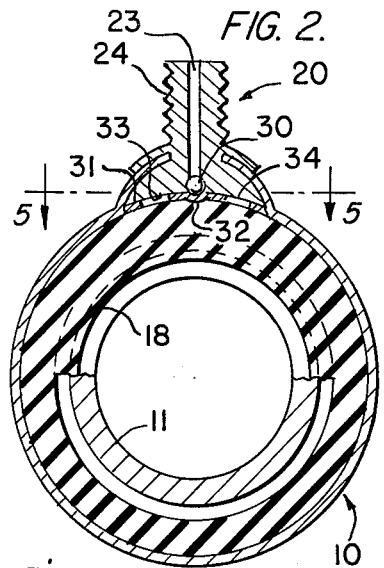
FIG. 2 is a cross-sectional view taken along lines 2—2 of FIG. 1.

Turning, now, to the drawings, attention is specifically directed to FIG. 1 where the device of the present invention will be seen to be a coupling 10. The coupling 10 is seen mounted over the end portion of one conduit 11 and over the end portion of yet another conduit 12. The said conduits are of substantially similar external diameter and it is desired to secure the said end portions axially in a lead-proof manner so that fluid carried therein will not migrate from the coupling 10.

The coupling is constructed of a cylindrical sleeve 13 which is preferably fabricated of a metal, but may be also fabricated from any material having excellent rigidity. The sleeve 13 has an internal diameter somewhat larger than the outer diameter of the end portions of the respective conduits. Internally of said sleeve and substantially co-extensive therewith is positioned a tubular member 14 which is constructed of elastomeric material such as natural rubber or synthetic resin. The tubular member 14 has an internal diameter of a dimension designed to establish generally a cleanance fit with respect to the outer diameter of the said resective conduits. The tubular member 14 is secured to the sleeve 13 near or at its ends by suitable means, such as by a suitable and well known adhesive means, vulcanization, mechanical deformation or a combination thereof. The drawings illustrate a preferred embodiment relative to securing the tubular member 14. With respect thereto, it will be noted that each of the ends of the sleeve 13 has rolled inwardly over a portion of each end 15 of the tubular member 14 to effect a bead or rolled edge 16. The underside 16A of the said rolled edge is seen to be displaced from the outer surface of the conduit. It will be noted that the tubular member 14 has annular end portions 14A which contact annularly a portion of each of the end portions 11 and 12 of the said conduits; thereby enabling a centering effect with respect to the said conduits and the coupling device 10. It is also within the contemplation of the invention to provide one or more longitudinal shallow slits in said end portions 14A whereby entrapped fluid may be forcibly expelled therethrough when said coupling is secured during the step as well as explained in greater detail hereinafter.

In the preferred embodiment it has been found efficacious to employ a tubular member 14 having suitable outer diameter dimensions whereby said tubular member 14 may be forced into configuration with the inner surface of sleeve 13 thereby defining an annular material receiving zone 21 between the outer surface of tubular member 14 and the said inner surface of sleeve 13. It will be appreciated that the manner of the juxtaposition of the sleeve 13 with respect to the tubular member 14 provides a zone 21 which is evacuated prior to use, that is, substantially no fluid is entrapped therein.

While the tubular member 14 may have a uniform thickness, the preferred embodiment shown in the drawings reveals a relatively thinner structure in the direction of the mid-point 17 between its two respective ends 15. It will be noted from the drawings that the tubular member 14, at substantially its mid-point 17 is provided with an inwardly extending annular ring 18 which is preferably integral with the tubular member 14. The mentioned annular ring 18 performs a useful function in acting as the longitudinal centering means so that a user of the device of the present invention may be assured that equal portions of the ends of the conduits have been positioned in the device. The annular ring 18 preferably possesses a radial dimension of approximately the wall thickness as that of the conduits so that the ring does not appreciably project into the internal portion of the conduits thereby avoiding restricting the flow of fluid in said conduits.

As part of the unique feature of the present invention a valve arrangement 20 is positioned on the outer surface of the sleeve 13 approximately normal thereto. The valve arrangement 20 is adapted and constructed, when in open condition, to provide communication with respect to the expandable annular space 21 located between the sleeve 13 and circumferentially about the tubular member 14.

The valve arrangement 20 includes an upstanding nipple 22 having a bore 23 therethrough and having a threaded portion 24 at its free outer end. In the preferred embodiment illustrated in the drawings the valve arrangement is secured to the sleeve through an opening 25 which is located in a dome-like portion 26 of the sleeve accomplished by conventional metal deformation, when the sleeve is fabricated of a metal. The nipple is secured within the opening 25 by means of outwardly sloping and extending annular flange 27 on the outward side of the dome-like portion 26. The curvatures of the flange 27 and the widened portion 28 is such that the dome-like portion in contact therewith is smoothly sandwiched therebetween.

Figure 5:
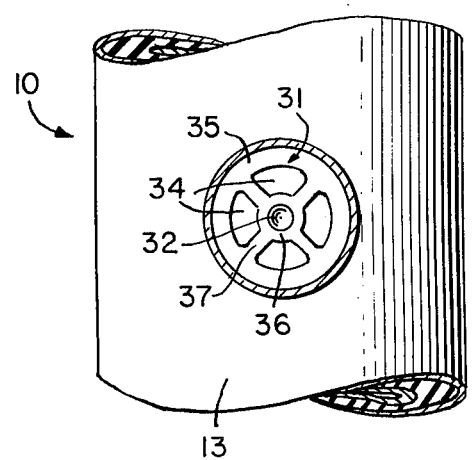
FIG. 5 is a cross-sectional view taken along line 5—5 of FIG. 2.

Bore 23 at the inward side thereof terminates in a ball 30 suitably seated at the end of the bore to act as a valve. The ball is seated in a normally closed position by means of a resilient disc 31 having a centrally disposed depression 32 for holding the ball. The disc 31 through the aegis of the outer surface of the tubular member 14 over which it overlies resiliently urges the ball 30 into seating arrangement. The disc 31 lies against the underside 33 of the widened portion of the nipple 22. The disc 31 possesses preferably a plurality of apertures 34. It will be noted from FIG. 5 that the disc 31 may preferably have an annular outer portion 35 and axially located central portion 36, containing the aforementioned ball carrying depression 32. The outer annular portion 35 and the axially located central portion 36 are attached together by means of a plurality of struts 37 whereby the aforementioned apertures 34 are defined.

Figure 3:
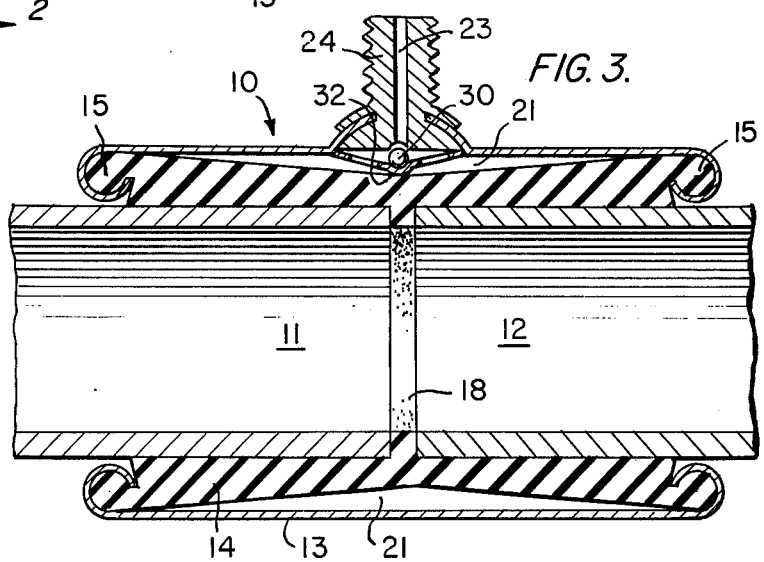
FIG. 3 is the same cross-sectional view as in FIG. 1 with the device of the present invention being secured.

In operation the device of the present invention is fitted with the end portion of conduits as illustrated, by a simple insertion thereinto into both ends of the device. As a result of such manipulative efforts, the view at this juncture will be the one shown in FIG. 1. When it is desired to removably secure the coupling of the present invention, a gas, such as nitrogen or air, under pressure (from a source not shown) is introduced through the valve arrangement 20 as noted from FIG. 3. This action unseats ball 30 from bore 23 and also unseats the disc 31 from the underside of the nipple permitting the air to pass through the apertures 34 into a space 21 now expanded as a result of the pressurized gas. The pressurized gas impinges annularly around the tubular member along its unsecured portion to move it inwardly, that is, to thrust it against the outer surfaces of the end portions of the conduits as clearly illustrated. Annular ring 18 is also carried inwardly to fit between the mentioned conduits to further enchance the desired sealing effect.

As the valve arrangement 20 is a normally closed valve, the gas may be maintained under pressure in the coupling. As long as pressurized gas, such as air is in the coupling, the posture of FIG. 3 will be obtained. The coupling may be retained in place for as long as desired and may be disconnected at anytime by releasing the gas pressure and thereafter pulling out from the device one or both of the conduits.

Figure 4:
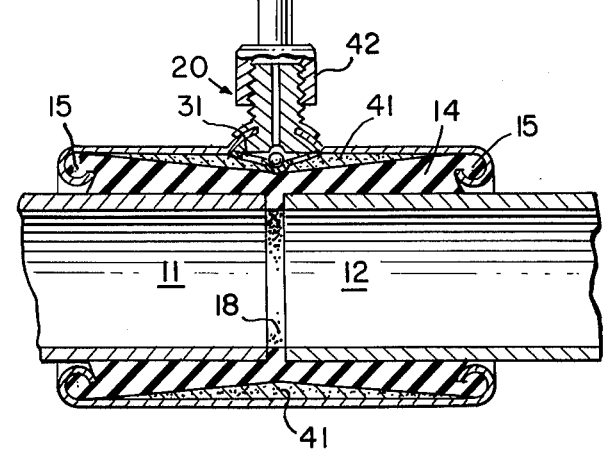
FIG. 4 is the same cross-sectional view as in FIGS. 1 and 3, to smaller scale, with settable material being incorporated into the device of the present invention.

A unique feature of the present invention resides in the inherent fact that with the release of the gas from the coupling, the elastomeric tubular member returns to its normal condition as shown in FIG. 1, for instance; thereby enabling easy removal of the end portions of the conduits from the coupling device. In the event the coupling is to be permanently secured, a settable synthetic resin material may be discharged under pressure into the device as illustrated by FIG. 4. It will be noted that a cartridge device 40 containing an epoxy cement 41, for instance, has a nozzle with a female threaded fitting 42 which is in threading engagement with the nipple 20 to provide axial discharge with respect to the contents of the cartridge 41. The displacement of the tubular member 14 is relatively identical to that discussed with respect to the use of the pressurized gas mentioned in the above. The epoxy cement, or like acting material, is permitted to set up or harden in space 21 whilst pressure on the fluid is maintained. When this desirable result has been achieved, the coupling will be permanently secured.

In the foregoing a specific valve arrangement has been discussed and disclosed at considerable length. It should definitely be borne in mind that other valve arrangements are contemplated as being within the purview of the invention; therefore the invention is in no way limited to that herein disclosed.

It is believed that from the foregoing description the structure and operation of the invention will be apparent to those skilled in the art, and it is to be understood that changes in the minor details of construction, arrangement and combination of parts may be resorted to, provided they fall within the spirit of the invention, and the scope of the appended claims.

What is claimed is:

1. A device for coupling end portions of two substantially axially aligned conduits having preselected essentially identical outer diameters with respect to said end portions and wherein said end portions are sealing encompassed by said device, comprising a sleeve, said sleeve having a bore therethrough, said bore having an axially inwardly facing cylindrical wall, a tubular elastomeric member positioned internally in said bore, said tubular elastomeric member having an internal diameter along its substantial length greater than the external diameter of said end portions of said preselected conduits, said tubular elastomeric member having a periphery with an outer diameter whereby its peripheral surface lies in intimate confrontation with the said wall of said bore, said tubular elastomeric member being adapted and constructed to normally and resiliently tensionally extend radially and outwardly against the said wall of said bore, and means sealingly attaching said tubular elastomeric member circumferentially only to circumferential end portions of said sleeve, that portion of said wall of said sleeve and said peripheral surface of the tubular member free of attachment one to the other define a relatively sealed evacuated expandable annular zone, normally closed valve means secured to said sleeve adapted and constructed to provide communication through said sleeve into said zone when said valve means is in an open condition for the introduction of pressurized fluid to expand said zone thereby urging tensionally, inwardly and radially a substantial portion of said elastomeric member thereby effecting sealing engagement of said tubular elastomeric member against the respective end portions of said axially aligned conduits, said valve when in a closed condition retaining said introduced fluid within said zone to maintain said engagement, when said valve is in an open condition, said tubular elastomeric member expels said pressurized fluid when in a fluid condition through said valve to thereby assume its normal condition.

2. The device of claim 1 wherein the tubular elastomeric member has an inwardly extending annular flange adapted and constructed to longitudinally position said end portions of said conduits in axially spaced relationship with said device.

3. The device of claim 2 wherein said tubular elastomeric member diminishes in thickness from substantially the ends thereof in the direction of said flange whereby an annular space is defined between the outer peripheral end portions of said conduits and the tubular elastomeric member when said zone has not been expanded.

4. The coupling device of claim 1 wherein said means sealingly attaching said tubular elastomeric member to said sleeve includes inwardly deformed outer circumferential end portions of said sleeve engaging and compressing the outer circumferential end portions of said tubular elastomeric member against said sleeve.

5. The coupling device of claim 4 wherein said means sealingly attaching said tubular elastomeric number to said sleeve includes sealing means at substantially the end portions of said sleeve and said tubular elastomeric member.

6. The coupling device of claim 1 wherein said valve means is a pressure sensitive valve normally urged closed.

7. The coupling device of claim 1 wherein said fluid is a gas.

8. The coupling device of claim 1 wherein said fluid is a liquid.

9. The coupling device of claim 8 wherein said liquid is a solidifier in situ.

* * * * *